Patented Nov. 26, 1935

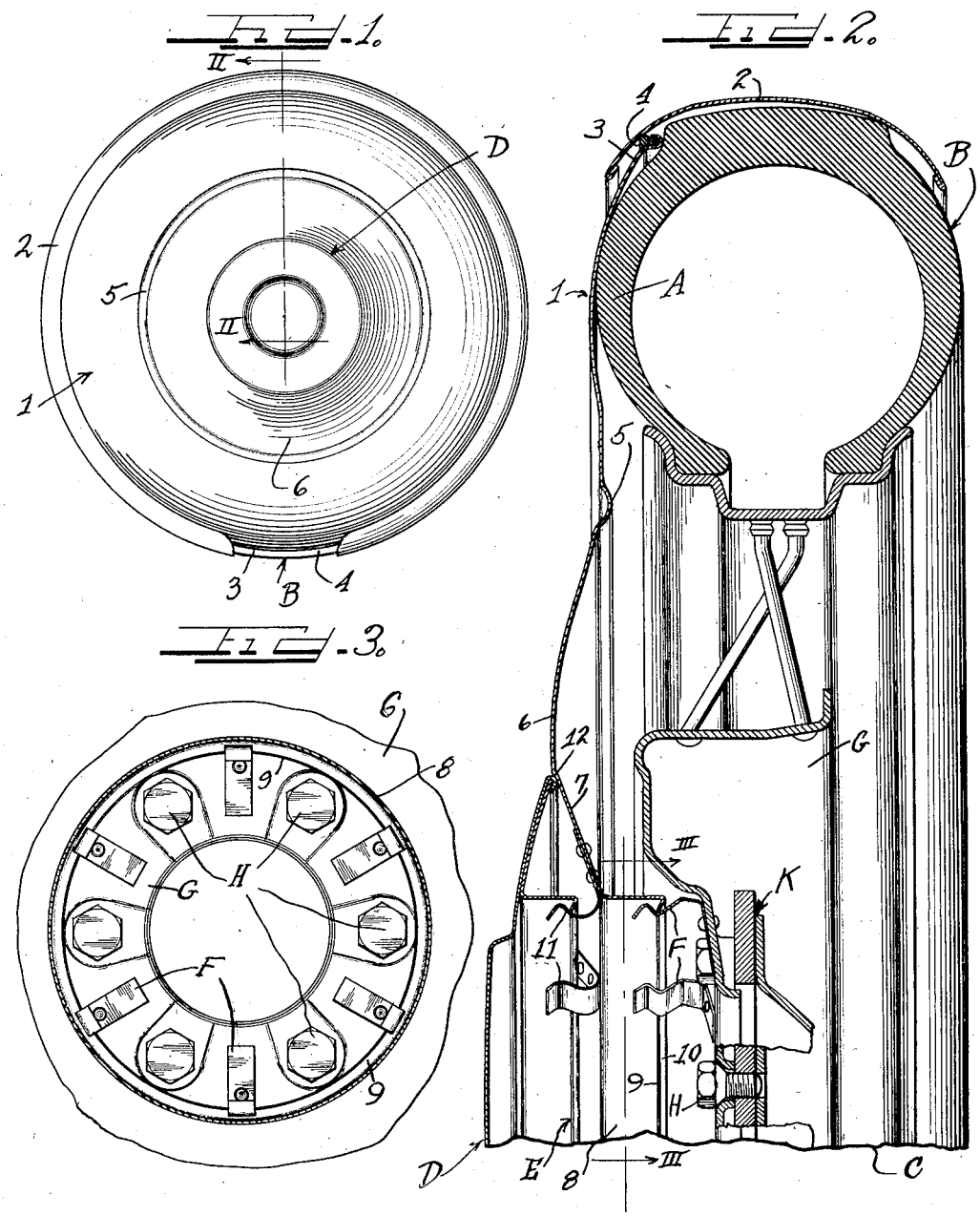

2,022,592

UNITED STATES PATENT OFFICE 2,022,592

TIRE COVER AND HUB CLOSURE

Arthur P. Fergueson, Detroit, Mich., assignor to Lyon Cover Company, Detroit, Mich., a corporation of Michigan Application July 10, 1933, Serial No. 679,637

6 Claims. (Cl. 150—54)

This invention has to do with tire covers of the character embodying a part for covering the outer side wall of a spare tire.

It is an object of this invention to provide means for centering a disc-like or drum-shaped tire cover in proper protecting relation to a spare tire.

It is another object of the invention to provide a disc-like cover for a spare tire with means whereby the same may be readily assembled and disassembled with the hub cap retaining means of the spare wheel, together with means which may be employed interchangeably with said retaining means for holding the hub cap on the tire cover.

It is another object of the invention to provide a spare tire cover with means to cooperate with the hub cap retaining means of the spare tire so that access is provided to the spare tire mounting bolts without requiring removal of the cover from the tire.

It is a still further object of the invention to provide a cover for a side of a spare tire, with retaining means interchangeable with the hub cap retaining means for the particular wheel, together with retaining means interchangeable with the retaining means forming a part of the hub cap, so that the cover may support the cap and be supported on the hub.

It is a still further object of the invention to provide radially yieldable retaining means on the hub for cooperation with the tire cover to compensate for slight variations in diameter of the retaining means forming a part of the cover.

Another object of the invention resides in the provision of yieldable hub cap retaining means in conjunction with a spare tire cover, affording a structure which serves to center the hub cap and at the same time resiliently urge the same toward and in firm engagement with the cover to prevent rattling therebetween.

It is another object of the invention to provide a spare tire cover with retaining means for a hub cap, together with a recess to receive and guide the outer periphery of the cap as the same is assembled with the cover.

The invention is susceptible of being carried out into practice in various forms. In accordance with one form, the cover includes a disc-like member for covering a side of the wheel and spare tire and is provided with a central annular anchoring or retaining member which may be identical or substantially identical with the corresponding member formed on the hub cap of the spare wheel. The hub is provided with an annular series of radially resilient spring elements adapted to cooperate with the anchoring member on the hub cap to hold the hub cap on the wheel, and these same elements accordingly co-operate with the anchoring member on the cover to hold it in assembled relation to the spare wheel and tire. If desired, the cover may be formed so that when properly assembled, the same may be held in substantial engagement with the adjacent side wall of the spare tire. The tire cover adjacent the anchoring member is provided with a series of radially resilient retaining elements corresponding with the first-mentioned retaining elements and arranged to cooperate with the anchoring member of the hub cap in substantially the same way in which the first-mentioned retaining elements cooperate with the anchoring member of the hub cap. The tire cover may be provided with means to assist in guiding and securing the hub cap to the cover. The cover may be formed to extend in covering relation to the opening in the wheel hub, but is preferably formed with a central opening of sufficient size to enable the insertion of a wrench to manipulate the bolts by which the spare tire is mounted on a carrier, so that this may be done without requiring removal of the tire cover but simply requiring removal of the hub cap from the cover.

The invention may be used with any desired form of tire cover, whether it consists of a disc-like side plate and a resilient tread covering member split or otherwise formed to assist the resilient retaining elements on the hub in holding the disc-like member in position, or a drum-shaped cover combining the side and tread covering portions.

Other and further important objects and advantages of the invention will be apparent from the disclosures in the specification and the accompanying drawing.

This invention (in a preferred form) is illustrated in the drawing and hereinafter more fully described.

On the drawing:

Figure 1 is an elevational view illustrating one form of the invention.

Figure 2 is a fragmentary enlarged sectional view taken substantially in the plane designated by the line II—II in Figure 1.

Figure 3 is a fragmentary sectional view taken substantially in the plane designated by the line III—III in Figure 2.

Referring now more particularly to the drawing, the tire cover constructed in accordance with the illustrated embodiment of the invention comprises a side plate or disc-like member 1 formed to substantially cover the outer side wall A of a spare tire B and also arranged to extend inwardly to overlie the spare wheel C short of the center of the wheel and in proximity to the outer periphery of the hub cap D. The side plate 1 is preferably formed of sheet metal but may be formed of any other suitable material which will preferably retain its shape. An outer ring 2 also preferably formed of sheet metal is constructed to extend across substantially the entire tread of the spare tire B and to overlap the outer peripheral margin 3 of the side plate, said margin being preferably provided with a cushioning strip 4 to prevent rattling between the parts 1 and 2. The ring 2 is split and is preferably resilient so that it not only holds itself on the tire but acts to force the side plate 1 toward and into hugging relation to the side wall A of the tire.

The side plate 1 may be provided with ornamentation of any desired character, and this is true also of the ring 2. The side plate in the illustrated embodiment of the invention is formed with an annular depression 5 to improve the same esthetically, and may be somewhat dished at 6. Adjacent its inner periphery, the side plate 1 is dished rearwardly at 7 and at the inner periphery of the portion 7 is formed with a substantially cylindrical collar 8 whose free marginal portion is bent inwardly at preferably an acute angle at 9 to provide an inclined cam surface 10.

The collar 8 and associated flange 9 are preferably substantially identical with the corresponding collar and flange E of the hub cap D, so that it may be mounted upon the resilient anchoring elements F of the wheel hub G. Just as the hub cap D is secured to the anchoring elements F by a snap action, so may the tire cover side plate 1 be secured or mounted upon the resilient elements F, and its removal is effected in the same way in which removal of the hub cap is effected, namely by an outward substantially axial pull by which the spring elements F are cammed inwardly.

A circumferential series of spring elements 11 is preferably secured to the rearwardly dished portion 7 of the side plate 1. These are substantially like the operative portions of the hub anchoring spring elements F. The anchoring elements 11 are formed so that, in series, they are the same distance from the axis of the cover 1 as the spring elements F are from the axis of the hub, so that said spring elements 11 serve to anchor the hub cap D through its collar and flange E in substantially the same manner in which the collar and flange E of the hub cap are anchored by the hub spring elements F. It will be observed that a portion of the tire cover which is dished rearwardly at 7 provides a guiding or positioning shoulder at 12 which is of substantially the same diameter as the outer periphery of the hub cap D. Said shoulder 12 thus assists in enabling the person attaching the hub cap to the tire cover to properly position the same with respect to the spring elements 11 so that said elements may readily snap by the hub cap retaining flange E.

It will thus be observed that the spring elements 11 on the tire cover member may be employed interchangeably with the hub spring elements F so that the hub cap may be readily mounted either on the tire cover or on the wheel hub G, and that the retaining flange structure of the tire cover member is substantially identical with the corresponding structure E of the hub cap so that the retaining structure of the tire cover member may be mounted interchangeably with the hub cap upon the hub spring elements F.

It is further to be noted that the means, such as the bolts H, cooperating with the tire carrier shown fragmentarily at K are arranged radially inwardly of the spring elements F and of the flange E of the hub cap D, and consequently radially inward of the tire cover retaining flange 9, so that when it is desired to dismount the wheel and tire from the carrier K, it is not necessary to remove the cover, but merely to remove the hub cap D from the cover thereon.

It is to be understood that the tire carrier may be mounted at the rear or at either side of the automobile or at any other place.

If desired, a unitary tire cover having substantially the form of a drum with its disc portion covering the outside of the wheel and tire and its rim covering the tire tread may be employed in the practice of the present invention.

While six of the spring elements F are illustrated on the drawing, it is to be understood that any greater or smaller number of such elements may be employed so long as the desired results are achieved. The number of spring elements 11 is likewise variable. In Figure 2, the spring elements 11 are shown to be alined with the spring elements F. This is merely coincidental since the cover 1 may be turned about its axis with respect to the position shown in Figure 2 to any desired degree and yet it will be fastened to the spring elements F in the same way as shown. In such event, the spring elements 11 will in all probability not be alined with the spring elements F and whether or not they are alined is immaterial, since their alinement has nothing to do with either the securement of the cover on the hub or the securement of the hub cap on the cover.

The tire cover is preferably of form retaining material, such as sheet metal. The anchoring elements F and 11 are preferably of spring metal, although any other material having the desired yielding characteristics may be employed.

I am aware that many changes may be made and numerous details of construction may be varied through a wide range without departing from the principles of this invention, and I, therefore do not purpose limiting the patent granted hereon otherwise than is necessitated by the prior art.

I claim as my invention:

1. In a wheel and cover assembly, a wheel having hub cap retaining spring elements, and a disk-like cover member disposed over an outer side of the wheel and provided with a rearwardly projecting part to engage said spring elements to be resiliently embraced thereby, spring means on the outer side of the disk member, and a hub cap snapped into engagement with said latter spring means and carried by the disk member.

2. In combination, a wheel centrally secured to a vehicle by a fastening bolt and having a plurality of spring elements adapted to retain a detachable hub cap on the wheel, a disk member having a rearwardly projecting part to engage said spring elements when said wheel hub cap has been removed to be resiliently embraced by said elements, said member having a central aperture, and a closure cap carried by the disk member for covering said aperture, said disk member being interchangeable with the wheel hub cap and like the hub cap being adapted to be pressed into engagement with said spring elements.

3. In a wheel and cover assembly, a wheel having hub cap retaining spring elements, and a disk-like cover member disposed over an outer side of the wheel and provided with a rearwardly projecting part to engage said spring elements to be resiliently embraced thereby, spring means on the outer side of the disk member, and a hub cap snapped into engagement with said latter spring means and carried by the disk member, said latter spring means being secured to said rearwardly projecting part.

4. In combination, a wheel centrally secured to a vehicle by a fastening bolt and having a plurality of spring elements adapted to retain a detachable hub cap on the wheel, a disk member having a rearwardly projecting part to engage said spring elements when said wheel hub cap has been removed to be resiliently embraced by said elements, said member having a central aperture through which access may be had to the wheel fastening bolt, and a closure cap carried by the disk member for covering said aperture, said disk member being interchangeable with the wheel hub cap and like the hub cap being adapted to be pressed into engagement with said spring elements, said aperture being defined by a depressed central portion of said disk member and spring means in said depressed portion for engaging said closure cap.

5. In combination, a wheel centrally secured to a vehicle by a fastening bolt and having a plurality of spring elements adapted to retain a detachable hub cap on the wheel, a disk member having a rearwardly projecting part to engage said spring elements when said wheel hub cap has been removed to be resiliently embraced by said elements, said member having a central aperture, and a closure cap carried by the disk member for covering said aperture, said disk member being interchangeable with the wheel hub cap and like the hub cap being adapted to be pressed into engagement with said spring elements, the retaining means for said disk member being disposed at the rear of the disk and concealed.

6. A spare tire cover including a circular side plate structure for disposition over an outer side of a tire and spare wheel assembly, including a disk-like portion having a central opening, an inwardly projecting cover retaining part located to the rear of and adjacent said opening for holding cooperation with said assembly, a closure cap disposed over said opening, and spring means projecting outwardly from said disk-like portion for holding said cap over said opening to conceal the opening.

ARTHUR P. FERGUESON.